United States Patent [19]
Oda et al.

[11] Patent Number: 4,463,312
[45] Date of Patent: Jul. 31, 1984

[54] SPEED SENSOR DEVICE

[75] Inventors: Yukihisa Oda, Toyota; Naoji Sakakibara; Hiroyuki Amano, both of Chiryu, all of Japan

[73] Assignee: Aisin Seiki Kabushiki Kaisha, Kariya, Japan

[21] Appl. No.: 367,388

[22] Filed: Apr. 12, 1982

[30] Foreign Application Priority Data

Apr. 13, 1981 [JP] Japan ................ 56-055249

[51] Int. Cl.³ .................... G01P 3/48; G01P 3/54
[52] U.S. Cl. ........................ 324/174; 200/84 C; 335/205
[58] Field of Search ................ 324/174, 168; 200/81.9 M, 84 C; 335/205

[56] References Cited

U.S. PATENT DOCUMENTS

| | | | |
|---|---|---|---|
| 3,359,385 | 12/1967 | Bentz et al. | 200/81.9 M UX |
| 3,421,124 | 1/1969 | Kidd | 200/81.9 M X |
| 3,750,124 | 7/1973 | Barnes et al. | 200/84 C X |
| 3,997,744 | 12/1976 | Higo | 200/84 C |
| 4,020,481 | 4/1977 | Nakagawa | 200/84 C X |
| 4,210,888 | 7/1980 | Holce | 335/205 X |
| 4,266,192 | 5/1981 | Ohtani | 324/174 X |

FOREIGN PATENT DOCUMENTS 1315442  5/1973  United Kingdom ......... 324/168

*Primary Examiner*—Stanley T. Krawczewicz
*Attorney, Agent, or Firm*—Oblon, Fisher, Spivak, McClelland & Maier

[57] ABSTRACT

A speed sensor device incorporates a reed switch which is controlled by the changes in the density of the magnetic flux in response to the displacement of a permanent magnet. The device comprises at least one permanent magnet positioned on a rotational shaft, a reed switch opened and closed in response to the rotational displacement of the permanent magnet, an elastic member protecting the periphery of the reed switch, a body member being made of a material having excellent electric conduction and receiving the reed switch, a supporter being in a thin plate form and also being made of a material having excellent electric conduction, and a projection formed on the supporter serving to secure the supporter to the body member.

4 Claims, 3 Drawing Figures

SPEED SENSOR DEVICE

BACKGROUND OF THE INVENTION

1. Field of the Invention

This invention relates generally to speed sensor devices and more particularly to a speed sensor device incorporating a reed switch which is controlled by the changes in the density of the magnetic flux occurring in response to the displacement of a permanent magnet.

2. Description of the Prior Art

In a conventional speed sensor device of this type, where a reed switch enclosed in a glass pipe is used, it is feared that the glass pipe will be damaged and that the electric contact between the reed switch and the lead wire will become defective. Further there is a disadvantage that the sensor device cannot be installed in a portion which is subject to strong vibration.

SUMMARY OF THE INVENTION

It is therefore an object of the present invention to eliminate the aforementioned and other disadvantages of prior art speed sensor devices.

More particularly, it is an object of the present invention to provide an improved speed sensor device of the type wherein a reed switch is enclosed in a glass pipe.

It is another object of the present invention to provide a speed sensor device which has excellent resistance to vibration.

The foregoing and other objects are achieved in accordance with the present invention by positioning the reed switch device in a body member made of a material having excellent electric conduction and through an elastic member protecting the periphery of the reed switch device. One terminal of the reed switch device is contacted with one end of a supporter, being in the form of a thin plate, which also is made of a material having excellent conduction. The supporter is pushed and contacted with the body member by means of projections formed on the other end of the supporter.

Accordingly, vibration which is transmitted from the body member to the reed switch device can be absorbed. Since the supporter, which is contacted with the terminal of the reed switch device, is in the form of a thin plate, vibration which is transmitted from the body member to the reed switch device through the supporter can be absorbed. Furthermore, even if the reed switch device and the body member are displaced from each other in different directions through an excessive vibration, a force operating on the terminal of the reed switch device is not produced since the deformation of the supporter is easy and light. Therefore, damage to the glass pipe can be prevented and the electric contact between the terminal and the supporter can be prevented from becoming defective. That is, since the supporter is pushed and contacted with the body member by means of projections formed on the supporter, the electric contact between the supporter and the body member can be prevented from becoming defective, even if an excessive vibration is produced.

Accordingly, it is possible to provide a reed switch device which is substantially vibration proof and, as a result, the objects of the present invention can be obtained. Adopting the above-mentioned construction, even if the relation of the position between the body member and the reed switch device displaces, the deformation of the supporter can cope with the displacement. Therefore, there is an advantage that it is possible to provide a reed switch device which has excellent vibration resistance characteristics.

BRIEF DESCRIPTION OF THE DRAWINGS

Other objects, features and attendant advantages of the present invention will become more apparent from the following detailed description thereof, when considered in connection with the accompanying drawings, wherein like reference characters are used to designate like or corresponding parts throughout the several views and in which.

DETAILED DESCRIPTION OF THE PREFERRED EMBODIMENT

Figure 1:
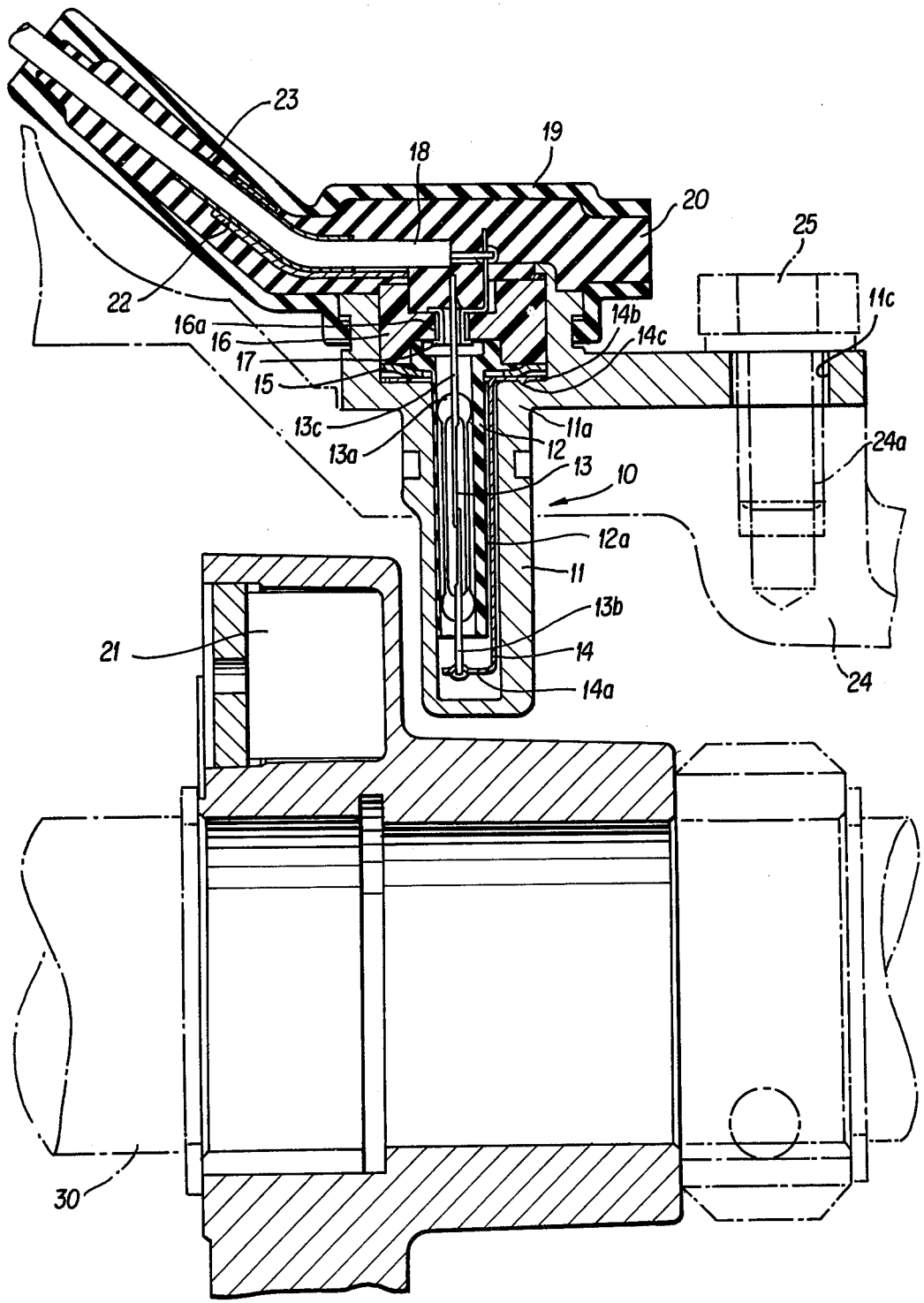
FIG. 1 is a sectional view of a reed switch device constructed in accordance with the present invention.

Referring now to the drawings and particularly to FIG. 1 thereof, a speed sensor device 10 of the present invention comprises a body member 11 formed of a material whose electric conduction is excellent. Interposed in the body member 11 is a reed switch device 13 whose glass pipe portion 13a is supported by an elastic member 12 which is tightly secured to the inner wall of the body member 11. One terminal 13b of the reed switch device 13 is electrically contacted with one end 14a of a support 14 made of a thin plate which is interposed between a notch groove 12a of the elastic member 12 and the inner wand of the body member 11 and has excellent electric conduction.

Figure 2:
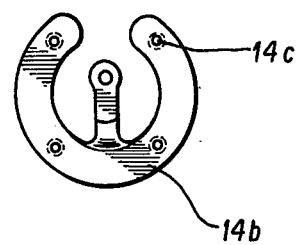
FIG. 2 is a top view of the supporter which is used in the reed switch device of FIG. 1.
Figure 3:
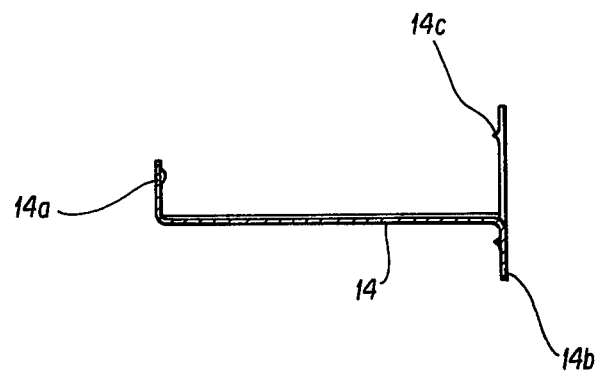
FIG. 3 is a side view of the supporter shown in FIG. 2.

As shown in FIG. 2 and FIG. 3, on the other end of the support 14 there is provided a nearly circular portion 14b, which includes a plurality of projections 14c on the side thereof facing the end 14a. The circular portion 14b of the supporter 14 is securely fixed on the body member 11 by caulking of an end portion 11b of the body member 11 through a wave washer 15 positioned on a step portion 11a, a block member 16 made of a nonconductive material, and a clamp 22. That is to say, the supporter 14 is secured to the body member 11 by means of the circular portion 14b being clamped thereagainst. A lead wire 18 is supported by means of the clamp 22 through a glass fiber tube 23. Fixed in an opening hole 16a formed in the center of the block member 16 is an outlet 17 which contacts electrically the other terminal 13c of the reed switch device 13 with the lead wire 18. This electric contact is fixedly secured together as a unit to the body member 11 by means of epoxide resin or the like, which is packed in a boot member 19. Furthermore, the body member 11 is fixed in a housing member 24 of a transmission by means of the engagement between a bolt 25 penetrating a hole 11c formed in the body member 11 and a screw hole 24a formed in the transmission housing 24. Fixed on a rotational shaft 30 is a cylindrical rotor 26 which includes a plurality of permanent magnets 21 positioned round the periphery thereof at equal angular intervals. Therefore, the rotor 26 rotates in response to the rotation of the rotational shaft 30 of the transmission. As a result, the plurality of permanent magnets 21 positioned round the periphery of the rotor 26 makes a rotational displacement. By means of this rotational displacement, the reed switch device 13 can be opened and closed in response to the changes in the density of the magnetic flux, thereby controlling the electric contact between the lead wire 18 and the body member 11 so that the electric contact may become electrically conductive or nonconductive. Thus, the speed sensor device 10 repeats the conditions of electric conduction and of nonconduction a number of times according to the rotation of the rotational shaft 30 of the transmission. Therefore, the number of the rotations of the rotational shaft 30 can be readily detected.

It can thus be appreciated that a speed sensor device is provided incorporating a reed switch enclosed in a glass pipe and yet substantially free of problems relating to vibration. Obviously many modifications and variations of the invention are possible in light of the above teachings. It is therefore to be understood that within the scope of the appended claims, the invention may be practiced otherwise than as specifically described herein.

What is claimed as new and desired to be secured by Letters Patent of the United States is:

1. A speed sensor device comprising:
   permanent magnet means positioned on a rotational shaft;
   a reed switch operably opened and closed in response to the rotational displacement of said pemanent magnet means;
   an elastic member protecting the periphery of said reed switch;
   a body member formed of an electrically conductive material;
   said reed switch being positioned in said body member through said elastic member;
   a supporter being in the form of a thin plate and being formed of an electrically conductive material;
   said reed switch having a terminal contacted with one end of said supporter; and
   projection means formed on the other end of said supporter;
   said supporter pushed and contacted with said body member through said projection means.

2. A speed sensor device according to claim 1, wherein said other end of said supporter is provided with a circular portion on which said projection means is formed.

3. A speed sensor device according to claim 1 wherein said thin plate of said supporter is interposed between said elastic member and an inner wand of said body member.

4. A speed sensor device according to claim 1 wherein a cylindrical rotor is fixed on said rotational shaft and said permanent magnet means is fixed to said rotor.

* * * * *